(12) United States Patent
Moore et al.

(10) Patent No.: US 8,135,907 B2
(45) Date of Patent: Mar. 13, 2012

(54) METHOD AND SYSTEM FOR MANAGING WEAR-LEVEL AWARE FILE SYSTEMS

(75) Inventors: William H. Moore, Fremont, CA (US);
Darrin P. Johnson, San Jose, CA (US);
Eric C. Saxe, Livermore, CA (US)

(73) Assignee: Oracle America, Inc., Redwood City, CA (US)

( * ) Notice: Subject to any disclaimer, the term of this patent is extended or adjusted under 35 U.S.C. 154(b) by 926 days.

(21) Appl. No.: 12/165,463

(22) Filed: Jun. 30, 2008

(65) Prior Publication Data

US 2009/0327602 A1    Dec. 31, 2009

(51) Int. Cl.
*G06F 12/00* (2006.01)

(52) U.S. Cl. ....................... 711/114; 711/112
(58) Field of Classification Search .......... None
See application file for complete search history.

(56) References Cited

U.S. PATENT DOCUMENTS

| | | | |
|---|---|---|---|
| 4,144,522 A | 3/1979 | Kageyama et al. | |
| 5,129,085 A | 7/1992 | Yamasaki et al. | |
| 5,155,847 A | 10/1992 | Kirouac et al. | |
| 5,371,885 A | 12/1994 | Letwin | |
| 5,403,639 A | 4/1995 | Belsan et al. | |
| 5,410,667 A | 4/1995 | Belsan et al. | |
| 5,675,802 A | 10/1997 | Allen et al. | |
| 5,819,292 A | 10/1998 | Hitz et al. | |
| 6,209,111 B1 | 3/2001 | Kadyk et al. | |
| 6,341,341 B1 | 1/2002 | Grummon et al. | |
| 6,728,922 B1 | 4/2004 | Sundaram et al. | |
| 6,745,284 B1 | 6/2004 | Lee et al. | |
| 6,745,305 B2 | 6/2004 | McDowell | |
| 6,795,966 B1 | 9/2004 | Lim et al. | |
| 6,829,617 B2 | 12/2004 | Sawdon et al. | |
| 6,857,001 B2 | 2/2005 | Hitz et al. | |
| 6,892,211 B2 | 5/2005 | Hitz et al. | |
| 7,007,196 B2 | 2/2006 | Lee et al. | |
| 7,032,154 B2 | 4/2006 | Kidorf et al. | |
| 7,043,677 B1 | 5/2006 | Li | |
| 7,133,964 B2 | 11/2006 | Rodrigues et al. | |

(Continued)

OTHER PUBLICATIONS

Austin, B.; "A Dynamic Disc Allocation Algorithm Designed to Reduce Fragmentation During File Reloading"; Information Sciences Laboratory, Corporate Research and Development Center, General Electric Company, 1970 (4 Pages).

(Continued)

*Primary Examiner* — Sanjiv Shah
*Assistant Examiner* — Daniel Tsui
(74) *Attorney, Agent, or Firm* — Osha • Liang LLP

(57) ABSTRACT

A method for wear level-based allocation in a storage pool. The method includes receiving a first request to write a first data item in a storage pool, where the storage pool includes a number of physical locations associated with the storage devices, and where each of the storage devices includes metadata regarding a level of wear of the storage device. The method further includes determining a first target physical location selected from the plurality of physical locations by using a wear-level selection policy and a wear cost for each of the storage devices, where the wear cost is determined based on a type of the storage device. The method further includes allocating a first data block to the first target physical location writing the first data block to the first target physical locations, wherein the first data block comprises a first portion of the first data item.

9 Claims, 10 Drawing Sheets

U.S. PATENT DOCUMENTS

| | | | |
|---|---|---|---|
| 7,162,486 | B2 | 1/2007 | Patel et al. |
| 7,174,352 | B2 | 2/2007 | Kleiman et al. |
| 7,200,715 | B2 | 4/2007 | Kleiman et al. |
| 7,225,293 | B2 * | 5/2007 | Lamberts ............... 711/112 |
| 2002/0004883 | A1 | 1/2002 | Nguyen et al. |
| 2002/0055942 | A1 | 5/2002 | Reynolds |
| 2002/0087788 | A1 | 7/2002 | Morris |
| 2002/0161972 | A1 | 10/2002 | Talagala et al. |
| 2003/0033477 | A1 | 2/2003 | Johnson et al. |
| 2003/0084242 | A1 | 5/2003 | Strange et al. |
| 2003/0126107 | A1 | 7/2003 | Yamagami |
| 2003/0145167 | A1 | 7/2003 | Tomita |
| 2004/0098720 | A1 | 5/2004 | Hooper |
| 2004/0107314 | A1 | 6/2004 | Kim et al. |
| 2004/0123063 | A1 | 6/2004 | Dalal et al. |
| 2004/0225834 | A1 | 11/2004 | Lu et al. |
| 2004/0234000 | A1 | 11/2004 | Page |
| 2005/0010620 | A1 | 1/2005 | Silvers et al. |
| 2005/0097270 | A1 | 5/2005 | Kleiman et al. |
| 2005/0235154 | A1 | 10/2005 | Serret-Avila |
| 2006/0218644 | A1 | 9/2006 | Niles et al. |
| 2007/0067559 | A1 * | 3/2007 | Fujibayashi et al. .......... 711/112 |
| 2007/0118576 | A1 * | 5/2007 | Moore et al. ................. 707/204 |
| 2009/0083558 | A1 * | 3/2009 | Sugiki et al. ................. 713/320 |
| 2009/0113123 | A1 * | 4/2009 | Joukov .......................... 711/112 |

OTHER PUBLICATIONS

Goodheart, N. et al.; "The Magic Garden Explained"; Prentice Hall, 1994 (8 Pages).

Stallings, W.; "Computer Organization and Architecture: Designing for Performance"; Prentice Hall, 2000 (4 Pages).

Sanberg, R. et al.; "Design and Implementation of the Sun Network Filesystem"; Sun Microsystems, Inc., In Summer USENIX Conference Proceedings, Portland, OR, 1985 (12 Pages).

McKusick, M. K. et al.; "A Fast File System for UNIX"; ACM Transaction on Computer Systems, vol. 2, No. 3, Aug. 1984, pp. 181-197 (17 Pages).

Astrahan, M. M. et al.; System R: Relation Approach to Database Management; ACM Transactions on Database Systems, vol. 1, No. 2, Jun. 1976, pp. 97-137 (41 Pages).

"Veritas File System 3.4 Administrator's Guide" Veritas Software Corporation, Nov. 2000, http://www.veritas.com; pp. 1-227 (227 Pages).

Czezatke, C. et al.; "Linlogfs: A Log-Structured Filesystem for Linux"; The USENIX Association, Proceedings of FREENIX Track: 2000 Usenix Annual Technical Conference, San Diego, California, Jun. 18-23, 2000 (13 Pages).

Osorio, N. et al.; "Guidelines for Using Snapshot Storage Systems for Oracle Databases"; Oracle Corporation, Oct. 2001 (13 Pages).

Quinlan, S.; "A Cached WORM File System"; AT&T Bell Laboratories, Murry Hill, New Jersey; Software-Practice and Experience, vol. 21 (12), pp. 1289-1299, Dec. 1991 (11 Pages).

Sun StorEdge Instant Image 2.0 System Administrators Guide; Sun Microsystems, Inc., Feb. 2000, Revision A (106 Pages).

Ylonen, T.; "Concurrent Shadow Paging: A New Direction for Database Research"; Laboratory of Information Processing Science, Helsinki University of Technology, SF-02150, Espoo, Finland, 1992 (8 Pages).

Popek, G. et al.; "The LOCUS Distributed System Architecture"; The MIT Press, Cambridge, Massachusetts, 1985 The Massachusetts Institute of Technology (8 Pages).

Gray, J. et al.; "The Recovery Manager of the System R Database Manager"; Computing Surveys, vol. 13, No. 2, Jun. 1981 (20 Pages).

Schilling, J.; "Enrwurf und Implementierung eines schnellen Filesystems fur UNIX unter bedonderer Berucksichtigung der technischen Parameter optischer Speichermedien und multimedialer Anwendungen"; Diplomarbeir Jorg Schilling, eingereicht am May 23, 1991 an der TU Berlin, and English Translation (245 Pages).

Ylonen, T.; "Concurrent Shadow Paging: Snapshots, Read-Only Transactions, and On-The-Fly Multi level Incremental Dumping"; Laboratory of Information Processing Science, Helsinki University of Technology, FIN-02150, Espoo, Finland, 1993 (22 Pages).

"The Enterprise Challenge Served by Snapshot"; Whitepaper, 2001 LSI Logic Corporation (8 Pages).

Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 Pages).

Suresh, Babu S.; "Persistent Snapshots"; Department of Computer Science and Automation, Indian Institute of Science, Bangalore—560 012, Jan. 2000 (38 Pages).

"Proceedings of the 5th Annual Linux Showcase & Conference" USENIX Association, Oakland, California, Nov. 5-10, 2001 (11 Pages).

Borg, A. et al.; "Fault Tolerance Under UNIX"; ACM Transactions on Computer Systems, vol. 7, No. 1, Feb. 1989, pp. 1-24 (24 Pages).

Rosenblum, M. et al.; "The Design and Implementation of a Log-Structured File System"; Electrical Engineering and Computer Sciences, Computer Science Division, University of California, 1991 (5 Pages).

Hecht, M. S. et al.; "Shadowed Management of Free Disk Pages with a Linked List"; ACM Transactions on Database Systems, vol. 8, No. 4, Dec. 1983, pp. 503-514 (12 Pages).

Rosenblum, M. et al.; "The LFS Storage Manager" Computer Science Division, Electrical Engineering and Computer Sciences, university of California; presented at the Summer '90 USENIX Technical Conference, Anaheim, California, Jun. 1990 (16 Pages).

Lorie, R. A.; "Physical Integrity in a Large Segmented Database"; ACM Transactions on Database Systems, vol. 2, No. 1, Mar. 1997, pp. 91-104 (14 Pages).

Johnson, J. E. et al.; "Overview of the Spiralog File System", Digital Technical Journal, vol. 8, No. 2, 1996, pp. 5-14 (10 Pages).

Santry, D. S. et al; "Deciding When to Forget in the Elephant File System"; 17th ACM Symposium on Operating Systems Principles (SOSP '99), Dec. 1999; pp. 110-123 (14 Pages).

Chutani, S. et al., "The Episode File System"; Proceedings of the 1992 USENIX Winter Technical Conference; 1992; (18 Pages).

Seltzer, M. L.; "File System Performance and Transaction Support"; University of California at Berkeley, 1992 (131 Pages).

Lascu, Octavian; "Configuration and Tuning GPFS for Digital Media Environments"; IBM; ibm.com/redbooks; (270 Pages).

"System Administration Guide"; Sun Microsystems, Inc.; Feb. 2000 (666 Pages).

An Introduction to GPFS v1.3 for Linux; White Paper; IBM; Jun. 2003 (14 Pages).

Ghemawat, Sanjay; "The Google File System"; Bolton landing, New York, USA; Oct. 19-22, 2003 (15 Pages).

* cited by examiner

METHOD AND SYSTEM FOR MANAGING WEAR-LEVEL AWARE FILE SYSTEMS

BACKGROUND

A typical operating system includes a file system. The file system provides a mechanism for the storage and retrieval of files and a hierarchical directory structure for the naming of multiple files. More specifically, the file system stores information provided by a user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

An application, which may reside on the local system (i.e., computer) or may be located on a remote system, uses files as an abstraction to address data.

Conventionally, this data is stored on a storage device, such as a disk.

To access a file, the operating system (via the file system) typically provides file manipulation interfaces to open, close, read, and write the data within each file. More specifically, the file system stores data on the storage device by managing the allocation of space within the storage device. Typically, the volume manager provides space which is managed by the file system. Two common types of file system space allocation strategies are known as block-based allocation and extent-based allocation. Block-based allocation creates incremental disk space for each file each time the file is extended (i.e., modified via a write request to add information), whereas extent-based allocation creates a large series of contiguous blocks (i.e., extents) each time the file exhausts the space available in the file's last extent.

When allocating space, both block-based and extent-based allocation use space provided by the volume manager. The volume manager allows multiple physical disks to be used as a single volume (i.e., a virtual disk) to provide larger consolidated storage sizes and simpler management. The volume manager allows users to organize data along volume boundaries (i.e., each volume has physical disk space allocated to the volume such that the volume is tied only to that dedicated physical disk). The volume manager is typically implemented as a separate layer between the physical disks and the file system, and is presented to the user as a virtual disk device. In other words, volume managers organize the collections of physical devices (e.g., disks) into virtual devices. Additionally, the space allocated within the volume manager is handled by the file system. Consequently, the volume manager is not aware of which blocks within the available storage space are in use and which blocks are free for data to be stored.

Further, file systems may be mounted on the virtual disk devices. Thus, physical disks are partitioned and allocated to multiple virtual disk devices, and each virtual disk device is capable of having a file system that exclusively uses that particular virtual disk device. A request to access a file is typically performed by an application, via the file system, using a file name and logical offset. This file name and logical offset (i.e., the manner in which applications express file operation requests) corresponds to a location within the virtual disk device. Subsequently, the request is translated to physical disk space on the storage device by the volume manager, allowing the user of the application to access the data within a particular file.

Typically, to add a disk to a volume, all data stored on the volume is backed up to an alternate location (i.e., another volume or any other alternate storage device outside of the volume). The volume is then destroyed and subsequently recreated with the new disk. Finally, the backed up data is transferred back onto the recreated volume. To avoid the need to recreate a volume when a disk is added to the volume, volumes are frequently over-provisioned. That is, a volume may be created using more disks than are initially needed. Thus, the disks are always available for use in the volume, whether or not the storage capacity of the disks is actually needed.

The reliability of physical disks degrades overtime compromised. The rate at which a given type of physical disk (e.g., hard disks, flash-type disk) degrades is a function of, for example, the number of time a hard disk is spun-up and/or spun-down, the number of times a given cell is written to and/or read from.

SUMMARY

In general, in one aspect, the invention relates to a method for wear level-based allocation in a storage pool. The method includes receiving a first request to write a first data item in a storage pool, wherein the storage pool comprises a plurality of storage devices and a plurality of physical locations associated with the storage devices, and wherein each of the plurality of storage devices comprises metadata regarding a level of wear of the storage device, determining a first target physical location selected from the plurality of physical locations by using a wear-level selection policy and a wear cost for each of the storage devices, wherein the wear cost is determined based on a type of the storage device, allocating a first data block to the first target physical location, writing the first data block to the first target physical locations, wherein the first data block comprises a first portion of the first data item.

In general, in one aspect, the invention relates to a method for retrieving a logical block. The method includes receiving a request to read the logical block, obtaining metadata associated with the logical block, wherein the metadata comprises a replication type used to store the logical block, physical block locations in a storage pool for each physical block associated with the logical block, wherein each physical block location specifies one of a plurality of storage devise in the storage pool, obtaining wear-level information comprising a level of wear for each of the storage devices specified in the physical block locations, selecting a first set of physical block locations using the metadata, the wear-level information, and a wear-level selection policy, generating a first set of I/O requests, wherein each I/O request specifies one of the first set of physical block locations, issuing a first set of I/O requests, receiving the first set of physical blocks in response to the first set of I/O requests, and constructing the logical block using the first set of physical blocks.

In general, in one aspect, the invention relates to a computer readable medium comprising a plurality of executable instructions for, retrieving a logical block, wherein the plurality of executable instructions comprises instructions to receive a request to read the logical block, obtain metadata associated with the logical block, wherein the metadata comprises a replication type used to store the logical block, physical block locations in a storage pool for each physical block associated with the logical block, wherein each physical block location specifies one of a plurality of storage devices in the storage pool, obtain wear-level information comprising a level of wear for each of the storage devices specified in the physical block locations, select a first set of physical block locations using the metadata, the wear-level information, and a wear-level selection policy, generate a first set of I/O requests, wherein each I/O request specifies one of the first set of physical block locations, issue a first set of I/O requests, receive the first set of physical blocks in response to the first set of I/O requests, and construct the logical block using the first set of physical blocks.

Other aspects of the invention will be apparent from the following description and the appended claims.

DETAILED DESCRIPTION

Figure 1:
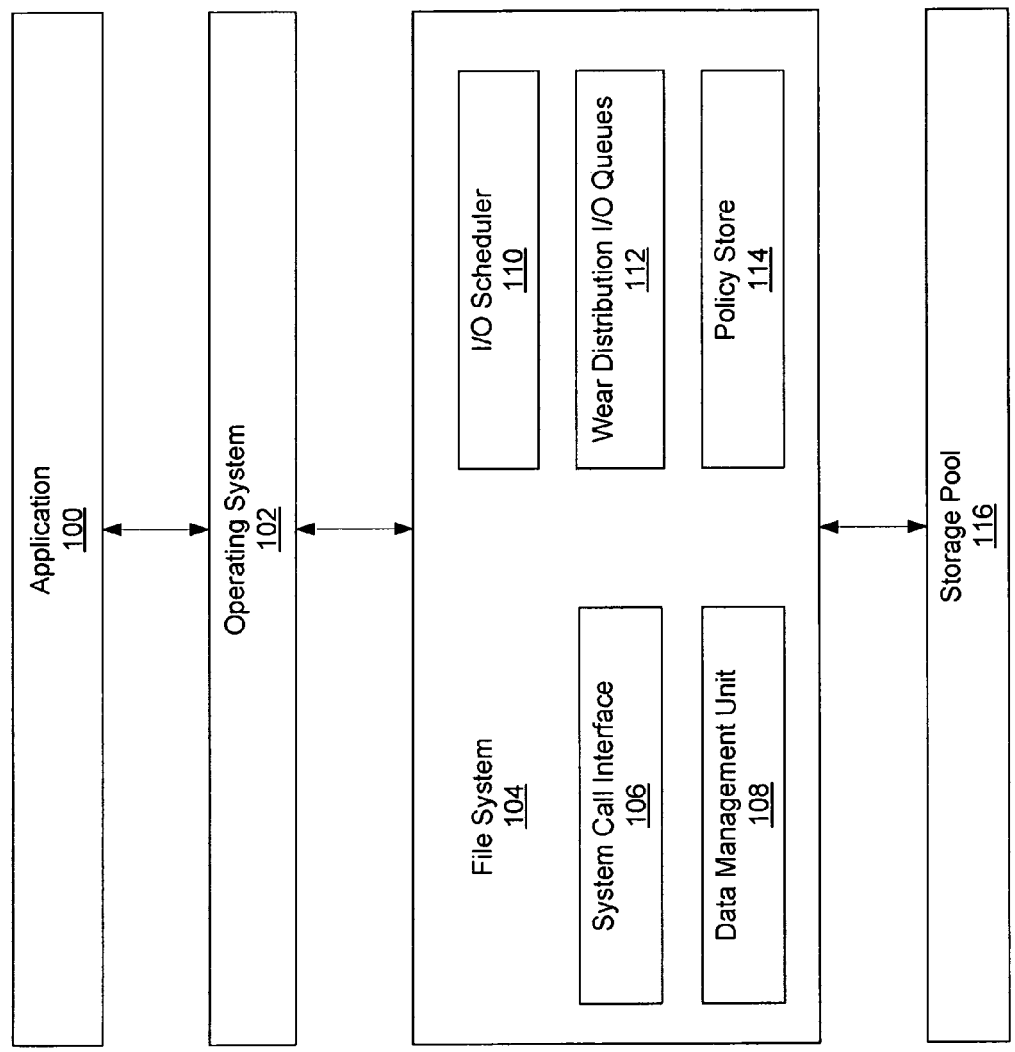
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for wear-level aware Input/Output (I/O) scheduling. Specifically, in one or more embodiments of the invention, an I/O scheduler uses a wear-level selection policy to determine a subset of physical blocks from which to read data and construct a requested logical block. In one or more embodiments of the invention, the wear-level selection policy evaluates the wear state of storage devices in a storage pool to determine the most efficient subset of physical blocks (from a wear perspective) from which to read and construct a logical block. Further, the I/O scheduler uses the wear-level selection policy to determine how to allocate data during write operations. In general, embodiments of the invention provide a policy to extend the useful life of a storage device by taking into account the level of wear for the storage devices.

FIG. 1 shows a system architecture in accordance with one or more embodiments of the invention. The system architecture includes an application (100) interfacing with an operating system (102). Further, the operating system (102) includes functionality to interact with a file system (104), which in turn interfaces with a storage pool (116). The operating system (102) typically interfaces with the file system (104) via a system call interface (not shown). The operating system (102) provides operations for users to access files within the file system (104). These operations may include read, write, open, close, etc. In one embodiment of the invention, the file system (104) is an object-based file system (i.e., both data and metadata are stored as objects). More specifically, the file system (104) includes functionality to store both data and corresponding metadata in the storage pool (116). Thus, the aforementioned operations provided by the operating system (102) correspond to operations on objects.

More specifically, in one embodiment of the invention, a request to perform a particular operation (i.e., a transaction) is forwarded from the operating system (102), via the system call interface, to the file system (104). In one embodiment of the invention, the file system (104) translates the request to perform an operation on an object directly to a request to perform a read or write operation (i.e., an I/O request) at a physical location within the storage pool (116). Further, the file system (104) includes functionality to issue I/O requests to the storage pool (116).

In accordance with one embodiment of the invention, the file system (104) may include an I/O scheduler (110), wear distribution I/O queues (112), a policy store (114), a system call interface (106), and a data management unit (DMU) (108). Each of these aforementioned modules may be used by the file system (104) to read data from and/or write data to the storage pool (116). Each of the aforementioned modules is detailed below.

In one embodiment of the invention, the I/O scheduler (110) receives I/O requests and groups the I/O requests into transaction groups. According to one or more embodiments of the invention, the I/O requests are assigned to one of the wear distribution I/O queues (112). The compression module (not shown) provides functionality to compress larger logical blocks into smaller segments, where a segment is a region of physical disk space. Further, the encryption module (not shown) provides various data encryption algorithms. The data encryption algorithms may be used, for example, to prevent unauthorized access. In one or more embodiments of the invention, the checksum module (not shown) includes functionality to calculate a checksum for data and metadata within the storage pool. The checksum may be used, for example, to ensure data has not been corrupted. As discussed above, the file system (104) provides an interface to the storage pool (116) and manages allocation of storage space within the storage pool (116). More specifically, in one or more embodiments of the invention, the file system (104) uses the metaslab allocator (not shown) to manage the allocation of storage space in the storage pool (116).

In one embodiment of the invention, the DMU (108) translates the request to perform an operation on an object directly to a request to perform a read or write operation at a physical location within the storage pool (116). More specifically, the DMU (108) represents the objects as data blocks and indirect blocks. Additionally, in one embodiment of the invention, the DMU (108 includes functionality to group related work (i.e., modifications to data blocks and indirect blocks) into I/O requests. The I/O Scheduler (110) receives transactions from the DMU (106) and subsequently issues I/O requests (e.g., write requests and read requests) to the storage pool (116).

In one or more embodiments of the invention, the storage pool (116) includes one or more storage devices. These storage device correspond to any medium capable of storing data and metadata. Example of storage devices include, but are not limited to, flash-type storage devices (e.g., NAND-Flash memory, NOR-Flash memory, etc.), hard disks (i.e., non-volatile storage devices which store digitally encoded data on rotating platters with magnetic surfaces), hybrid storage devices (i.e., storage devices that include two or more types of storage media, for example, flash-type medium and magnetic media), or a combination thereof. Further, in one or more embodiments of the invention, the storage capacity of the storage pool (116) may increase and decrease dynamically as storage devices are added and/or removed from the storage pool.

In one or more embodiments of the invention, the file system (104) includes one or more wear distribution I/O queues (112). Each wear distribution I/O queue (112) is associated with a storage device in the storage pool (116). Each wear distribution I/O queue (112) typically holds the I/O requests for a particular physical disk within the storage pool (116). Alternatively, there may be one wear distribution I/O queue (112) for the entire storage pool (116) (or for a portion of the storage pool (116)). In one or more embodiments of the invention, the file system (104) includes functionality to select which wear distribution I/O queue (112) to send an I/O request. In one or more embodiments of the invention, the file system (104) includes the functionality to select which wear distribution I/O queue (112) using the I/O scheduler (110), a policy in the policy store (114), and metadata regarding the storage devices in the storage pool (116).

Figure 2:
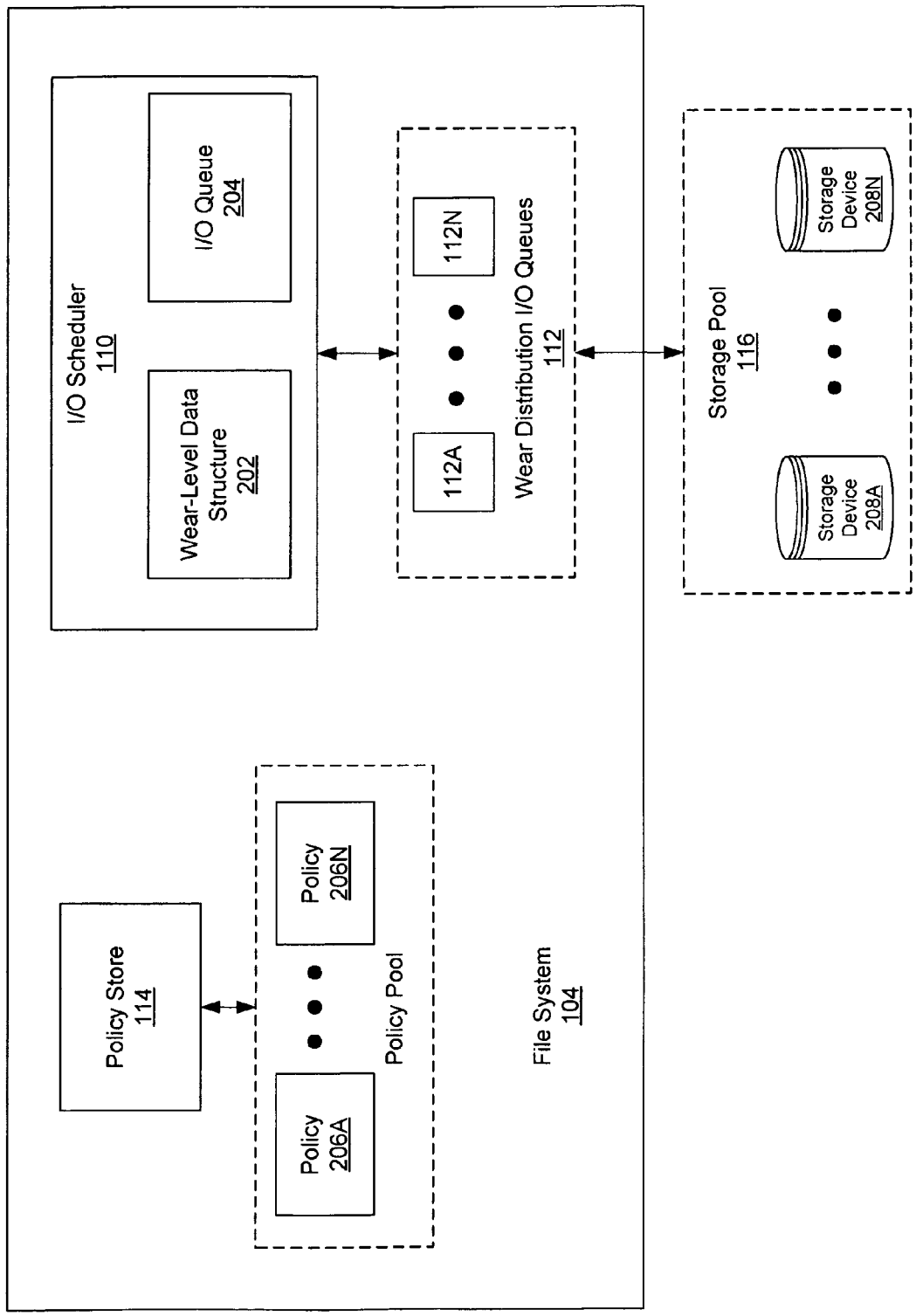
FIG. 2 shows a system in accordance with one or more embodiments of the invention.

FIG. 2 shows a block diagram of a file system in accordance with one or more embodiments of the invention. The file system (104) includes an I/O scheduler (110) and one or more wear distribution I/O queues (112). The I/O scheduler (110) includes a wear state data structure (202) and an I/O queue (204) and is used to manage various I/O requests. In one or more embodiments of the invention, the wear state data structure (202) is configured to store metadata regarding the wear states of each of a set of storage devices in a storage pool, and may also store a threshold wear level for each of the storage devices in the storage pool.

In one embodiment of the invention, the wear state maintains the level of wear on a given storage device. The manner in which the level of wear is quantified is based on the storage medium in the storage device. For example, if the storage device includes a hard disk(s), then the level of wear may be quantified by tracking the number of times the hard disk is spun-up, the number of time the hard disk is spun-down, and/or the number of times the hard disk performs one cycle (spun-up/spun-down). Alternatively, if the storage device includes flash-type memory, then the level of wear may be quantified by the tracking the number of writes each cell in the storage device, the number of writes to the storage devices as a whole, the number of reads to each cell in the storage device, or a combination thereof.

In one or more embodiments of the invention, the threshold wear level defines the wear state at which the storage device is no longer reliable for reading or writing data. For example, after a hard disk has been spun-up and spun-down a certain number of time, the reliability of the data (including metadata) stored on the hard disk falls below an acceptable level. Specifically, the ability to write data to a given sector on the hard disk and subsequently retrieve the data from the sector (in a non-corrupted form) is below an acceptable level. For example, the data is retrieved from the storage device in a corrupted form more than fifty percent of the time. Those skilled in the art will appreciate that the above examples are for illustrative purposes only and are not intended to limit the scope of the application.

Continuing with the discussion FIG. 2, the I/O queue (204) is used to initially store I/O requests sent from applications. In one or more embodiments of the invention, each of the wear distribution I/O queues (112) corresponds to a storage device in a storage pool (116).

In addition, the file system (104) includes a policy store (114). The policy store (114) includes a number of policies (206A-206N). In one or more embodiments of the invention, one or more of the policies is a wear-level selection policy which define a policy for selecting a set of physical blocks to read to construct a logical block and/or for selecting blocks for writing a logic block. In one or more embodiments of the invention, a policy (206A) may select blocks based on the amount of wear required to obtain the blocks, where the selected blocks minimize the amount of wear on the storage devices required to obtain the blocks. For example, if data may be written to one of (i) a spun-down hard disk, (ii) a spun-up hard disk; or (iii) flash-type memory, the policy may select the spun-up hard disk as this result in minimal wear to hard disk as opposed to spinning-up a hard disk or writing to a flash-type memory, each of each causes substantially more wear.

In another example, the wear-level policy (206N) may be used to read to a disk that is already spun up rather than a spun-down disk, or a flash-type drive. It is important to note that these wear-level selection policies may also be used to determine to which storage devices to read. In particular, such a policy may attempt to read to storage devices that have the lowest wear-level to wear-level threshold ratio.

Alternatively, the wear-level selection policies may also take into account the performance requirements of the applications. For example, a wear-level policy may select a flash-type memory to store data for performance purposes even though this may result in a lower useful life of the storage device. However, if the storage pool includes multiple storage devices that include flash-type memory, then the wear-level policy may select the storage device with the lower wear-level to wear-level threshold ratio.

In one or more embodiments of the invention, the wear-level policy may also define a migration trigger, which dictates that as storage devices in the storage pool approach their wear-level threshold, it becomes necessary to migrate the data to other storage devices. Further discussion of data migration in storage pools can be found in copending U.S. patent application Ser. No. 11/407,719 entitled "Method and System for Metadata-Based Resilvering," filed on Apr. 19, 2006, the entire contents of which are incorporated herein by reference.

The I/O scheduler (110) receives I/O requests from an application to read a logical block of data, which has been stored as a set of physical blocks. These I/O requests are placed on the I/O queue (204). The I/O scheduler (110) may then determine a set of physical blocks to read based on metadata regarding the wear level of storage devices (208A-208N) in a storage pool (116) stored in the wear state data structure (202), the wear cost of the I/O operation, and the wear-level selection policy (not shown) stored in the policy store (114). The I/O requests on the I/O queue (204) may then be placed on the appropriate wear distribution I/O queues (108), which are associated with storage devices upon which the selected physical blocks are stored.

Figure 3:
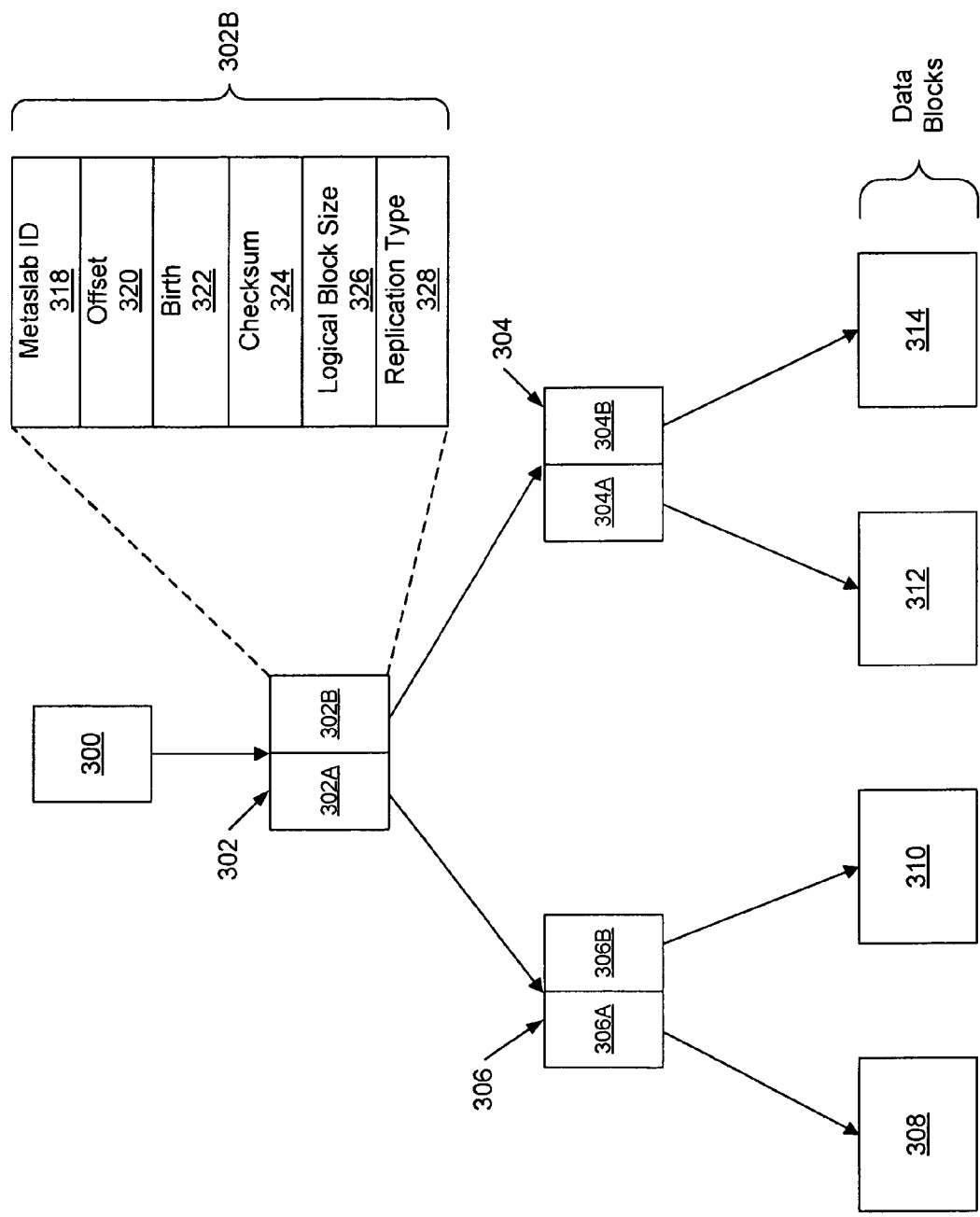
FIG. 3 shows a system in accordance with one or more embodiments of the invention.

FIG. 3 shows a diagram of a hierarchical data configuration (hereinafter referred to as a "tree") in accordance with one or more embodiments of the invention. As noted above, the storage pool (116) is divided into metaslabs, which are further divided into segments. Each of the segments within the metaslab may then be used to store a data block (i.e., data) or an indirect block (i.e., metadata). In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306).

In one embodiment of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) include actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (116 in FIGS. 1 and 2). In one embodiment of the invention, the root block (300) and each block pointer (e.g., 302A, 302B, etc.) includes data as shown in the expanded block pointer (302B). One skilled in the art will appreciate that data blocks do not include this information; rather, data blocks include actual data of files within the file system.

In one embodiment of the invention, each block pointer includes a metaslab ID (318), an offset (320) within the metaslab, a birth value (322) of the block referenced by the block pointer, a checksum (324), a logical block size (326), and a replication type (328) of the data stored in the block (data block or indirect block) referenced by the block pointer. In one embodiment of the invention, the metaslab ID (318), offset (320), logical block size (326), and replication type (328) are used to determine the locations of the block (data block or indirect block) in the storage pool. The metaslab ID (318) identifies a particular metaslab.

More specifically, the metaslab ID (318) may identify the particular disk (within the storage pool) upon which the metaslab resides and where in the disk the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, a given block (e.g., any of the root, indirect blocks, and/or data blocks shown in FIG. 3) may be stored as a series of smaller blocks. For example, a 2 Kbyte block may be stored as a four 512 byte blocks. In such cases, the 2K block is referred to as a logical block and the four 512 blocks are the physical blocks (i.e., blocks stored in the storage pool). In another example, the 2 Kbyte block may be stored using a replication policy such as RAID-5. In such cases, the logical block is the 2 Kbyte block and the physical blocks include the four 512 byte blocks along with the requisite parity blocks.

Returning to the discussion of FIG. 3, in one or more embodiments of the invention, the logical block may be stored using a replication method (where the replication method may be different for each block). For example, using a mirroring method, there will be several full copies of the logical block located in the file system, stored as several sets of physical blocks. Another example is a RAID-type method, which uses parity blocks along with a set of physical blocks, allowing for the entire logical block to be constructed should one or more of the physical blocks become corrupted. The logical block size and the replication type may be used to determine the location of the corresponding physical blocks in the storage pool. When a replication method is used, there is more than one set of physical blocks that may be used to construct a logical block. In one embodiment of the invention, the I/O scheduler (106 in FIGS. 1 and 2) is configured to select the set of physical blocks to retrieve in order to construct the requested logical block. As discussed above, the manner in which the set of physical blocks is selected is based on the wear-level selection policy.

Figure 4:
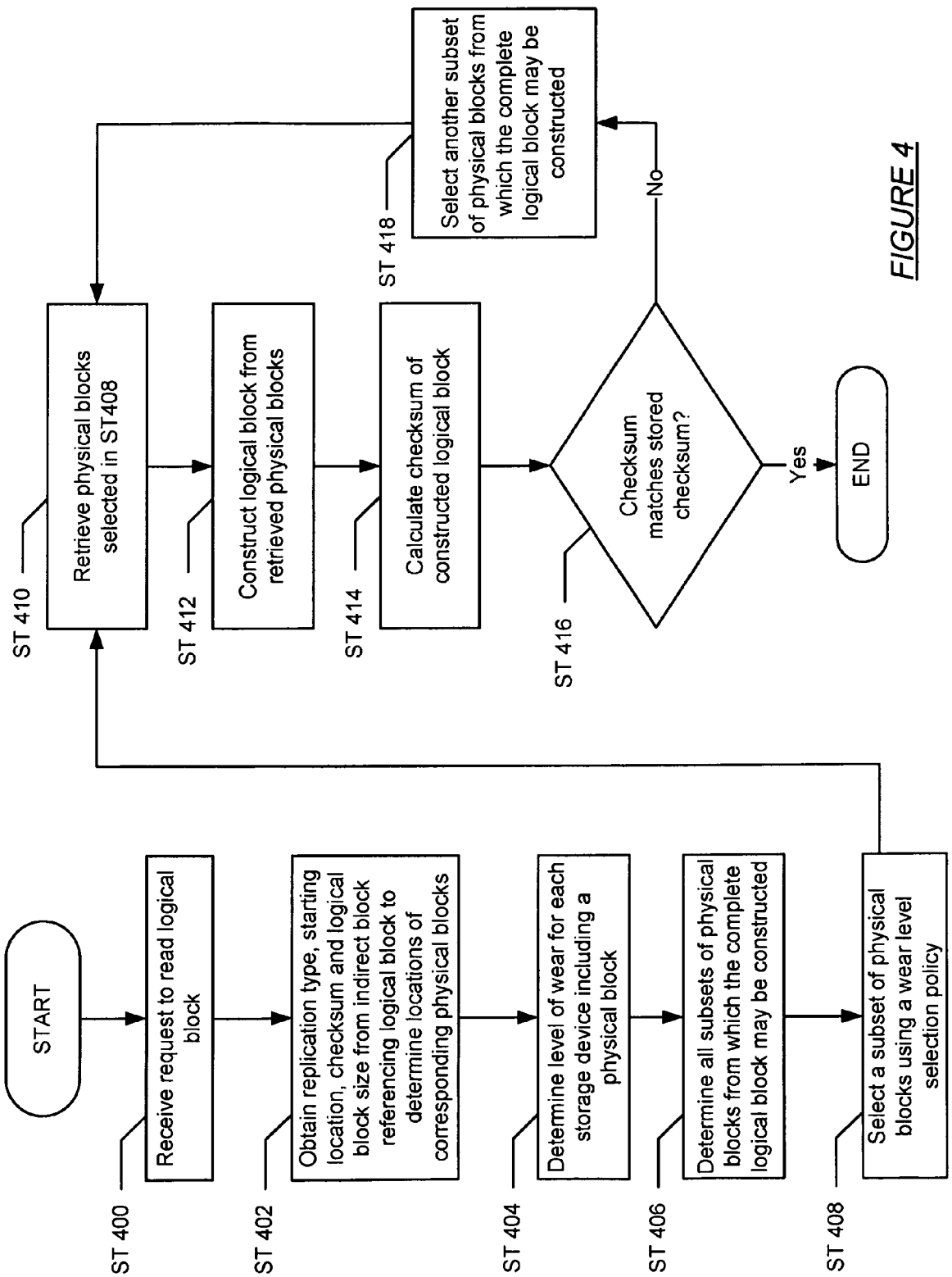
FIG. 4 shows a flow chart in accordance with one or more embodiments of the invention.

FIG. 4 shows a flow chart in accordance with one or more embodiments of the invention. More specifically, FIG. 4 details a method for reading a logical block in accordance with one or more embodiments of the invention.

In ST 400, the I/O scheduler receives a request to read a logical block. In ST 402, the I/O scheduler obtains metadata regarding the requested logical block. This metadata may include the replication method used to store the logical block, the starting location of the stored physical blocks, the size of the logical block, and the checksum of the logical block. This information allows the I/O scheduler to determine the locations of all the physical block stored in the storage pool that are associated with the requested logical block.

In one embodiment of the invention, the information obtained in ST 402 may be obtained from the indirect block referencing the logical block (see FIG. 3). The logical block size stored in the indirect block referencing the logical block indicates the actual size of the logical block. In other words, because the logical block size of data may be different than the number of blocks placed on store the data (i.e., due to the use of a replication policy to write the data), the logical block size is required to determine how and where the physical data corresponding to the logical block is stored in the storage pool.

In ST 404, the I/O scheduler determines the level of wear of each storage device on which one or more of the physical blocks identified in ST 402 are located. In one embodiment of the invention, the level of wear for each storage device in the storage pool is stored in a wear-level data structure.

In ST 406, the I/O scheduler determines all subsets of physical blocks from which the complete requested logical block may be constructed. According to one or more embodiments of the invention, there may be several subsets of physical blocks from which the requested logical block may be constructed due to a replication method that was used when the logical block was written to the storage pool.

In ST 408, the I/O scheduler selects one of the subsets of physical blocks from which to obtain the data corresponding to the logical block based on the wear-level policy and the wear cost associated with obtaining the various subsets of the physical blocks. In one embodiment of the invention, the selected subset of physical blocks is the subset with the lower wear cost. In one embodiment of the invention, the wear cost of obtain a physical block is determined by the amount of wear incurred by the storage device to obtain the block. As discussed above, the level of wear may be quantified on a per-storage medium basis. For example, the wear cost for a hard disk may be zero (for purposes of the wear-level policy) if the hard disk is spun-up, and the wear cost may be one (for purposes of the wear-level policy) if the hard disk is spun down. Further, the wear cost for a read operation on flash-type memory may be two (for purposes of the wear-level policy).

Those skilled in the art will appreciate that the wear cost for a given storage device and relative wear cost of different storage devices (e.g., the relative wear cost for performing a read on a hard disk as compared with a flash-type memory) may determine on an implementation-by-implementation basis.

Returning to the discussion of FIG. 4, I/O requests are then placed on the wear distribution I/O queues associated with the storage devices on which the selected subset of physical blocks are located. In ST 410, each of the physical blocks in the selected ST408 are retrieved. In ST 412, the requested logical block is constructed from the retrieved blocks. In ST 414, the checksum of the constructed logical block is calculated. In ST 416, a determination is made about whether the checksum calculated in ST 414 matches the checksum obtained in ST 402. If the checksums match, then the logical block has been read successfully and the process ends.

In ST 418, if the checksums do not match, then another subset of physical blocks is selected, which also allow for the construction of the requested logical block. The process then proceeds to ST 410.

Once the read request is completed, the wear-level data structure may be subsequently updated to reflect any additional wear resulting from servicing the read request.

While the various steps in this flowchart are presented and described sequentially, one of ordinary skill will appreciate that some or all of the steps may be executed in different orders, may be combined or omitted, and some or all of the steps may be executed in parallel. In addition, steps such as store acknowledgements have been omitted to simplify the presentation.

Figure 5:
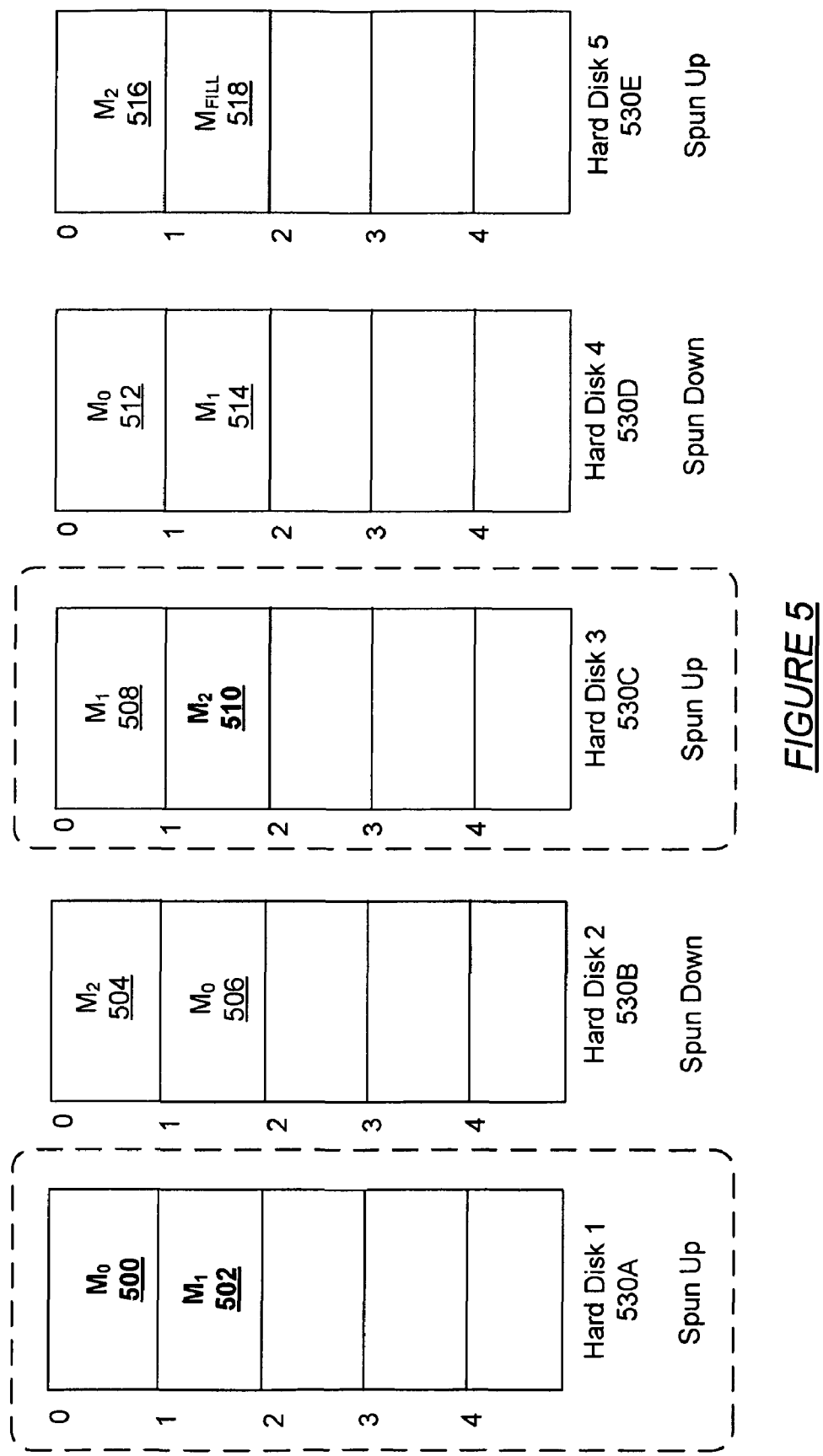
FIG. 5 shows a system in accordance with one or more embodiments of the invention.

FIG. 5 shows a diagram of a storage pool in which logical block M has been stored using 3-way mirroring. For the purposes of this example assume that the I/O scheduler has received a request to obtain logical block M and the storage pool only includes hard disks (530A-530E).

Upon receiving the request to retrieve logical block M, the logical block size is obtained. In this example, the logical block size of logical block M is 1.5 Kbytes and each physical block in the storage pool is 512 bytes. Accordingly, each copy of the logical block requires three physical blocks. Thus, the total amount of physical space occupied by logical block M is 4.5 Kbytes (or nine physical blocks) (i.e., $M_0$ (500), $M_1$ (502), $M_2$ (504), $M_0$ (506), $M_1$ (508), $M_2$ (510), $M_0$ (512), $M_1$ (514), $M_2$ (516)). In this example, the file system stores logical blocks (including copies) in even numbers of physical blocks, thus, in order to store 1.5 Kbytes ten physical blocks are allocated—the nine previously cited physical blocks and $M_{FILL}$ (518). Based on the replication scheme, there are a number of subsets of physical blocks which may be retrieved in order to construct the logical block.

More specifically, the logical block M is composed of three physical blocks: $M_0$, $M_1$, and $M_2$. Therefore, in order to be able to construct the full logical block from a set of physical blocks, the I/O scheduler may pull one of several sets of physical blocks. First, the I/O scheduler identifies the physical blocks corresponding to the logical block (i.e., ($M_0$ (500), $M_1$ (502), $M_2$ (504), $M_0$ (506), $M_1$ (508), $M_2$ (510), $M_0$ (512), $M_1$ (514), $M_2$ (516)). The I/O scheduler then determines the wear cost of each disk that includes at least one of the aforementioned physical blocks.

In this example, Disks 1 through Disk 5 (530A through 530E) hold the physical blocks that correspond to the logical block M. The power states for each of these disks is as follows:

Disk 1 (530A): Spun Up;
Disk 2 (530B): Spun Down;
Disk 3 (530C): Spun Up;
Disk 4 (530D): Spun Down; and
Disk 5 (530E): Spun Up.

Once the I/O scheduler determines these power states, the I/O scheduler may then determine each subset of physical blocks that may be used to construct the logical block. For this example, in order to construct logical block M, one copy of each of: $M_0$, $M_1$, and $M_2$ must be obtained. The following are the potential subsets:

($M_0$ (500), $M_1$ (502), $M_2$ (504))
($M_0$ (500), $M_1$ (502), $M_2$ (510))
($M_0$ (500), $M_1$ (502), $M_2$ (516))
($M_0$ (500), $M_1$ (508), $M_2$ (504))
($M_0$ (500), $M_1$ (508), $M_2$ (510))
($M_0$ (500), $M_1$ (508), $M_2$ (516))
($M_0$ (500), $M_1$ (514), $M_2$ (504))
($M_0$ (500), $M_1$ (514), $M_2$ (510))
($M_0$ (500), $M_1$ (514), $M_2$ (516))
($M_0$ (506), $M_1$ (502), $M_2$ (504))
($M_0$ (506), $M_1$ (502), $M_2$ (510))
($M_0$ (506), $M_1$ (502), $M_2$ (516))
($M_0$ (506), $M_1$ (508), $M_2$ (504))
($M_0$ (506), $M_1$ (508), $M_2$ (510))
($M_0$ (506), $M_1$ (508), $M_2$ (516))
($M_0$ (506), $M_1$ (514), $M_2$ (504))
($M_0$ (506), $M_1$ (514), $M_2$ (510))
($M_0$ (506), $M_1$ (514), $M_2$ (516))
($M_0$ (512), $M_1$ (502), $M_2$ (504))
($M_0$ (512), $M_1$ (502), $M_2$ (510))
($M_0$ (512), $M_1$ (502), $M_2$ (516))
($M_0$ (512), $M_1$ (508), $M_2$ (504))
($M_0$ (512), $M_1$ (508), $M_2$ (510))
($M_0$ (512), $M_1$ (508), $M_2$ (516))
($M_0$ (512), $M_1$ (514), $M_2$ (504))
($M_0$ (512), $M_1$ (514), $M_2$ (510))
($M_0$ (512), $M_1$ (514), $M_2$ (516))

Using the wear-level selection policy, the aforementioned subsets, and the power states in the wear state data structure, the I/O scheduler determines the aggregate wear cost for reading logical block M using each of the subsets. According to one or more embodiment of the invention, the wear-level selection policy considers reading from hard disks that are currently spun-up a zero wear cost, and reading from hard disk that are currently spun-down a wear cost of one. In this example, because Disk 1 (530A), Disk 2 (530C), and Disk 3 (530E) are already spun up, the aggregate wear cost is zero. In this example, to avoid unnecessarily spinning up any more disks, the following physical blocks could be read to construct logical block M:

($M_0$ (500), $M_1$ (502), $M_2$ (510))
($M_0$ (500), $M_1$ (502), $M_2$ (516))
($M_0$ (500), $M_1$ (508), $M_2$ (510))
($M_0$ (500), $M_1$ (508), $M_2$ (516))

In the example shown, the I/O scheduler has chosen to read from Disk 1 (530A) and Disk 3 (530C), which hold the physical block combination: ($M_0$ (500), $M_1$ (502), $M_2$ (510)). A person skilled in the art will appreciate that this is a simplified version of how the I/O scheduler would select the subset of physical blocks and disks to read from using the wear states. There may be other differences in the characteristics of each disk and how it is running that affect the wear cost required to read data located on the disk. The I/O scheduler may have chosen other combinations of physical blocks from the same storage devices. For example, reading from physical blocks ($M_0$ (500), $M_1$ (508), and $M_2$ (510)) would again only require reading from Disk 1 (530A) and Disk 3 (530C).

Further, because the logical block was written using a mirrored replication method in the storage pool, finding a number of subsets of physical blocks from which combine to form the logical block allows for the I/O scheduler to make use of advantages provided by a mirrored replication system. For example, if the I/O scheduler sends requests to the wear distribution I/O queues corresponding to Disk 1 (530A) and Disk 3 (530C), but found that Disk 3 (530C) was corrupt, there are alternative subsets of physical blocks located on disks that already spun up. For example, the I/O scheduler may send I/O requests to the wear distribution I/O queues corresponding to Disk 1 (530A) and Disk 5 (530E). In doing so, the file system may read the subset of physical blocks ($M_0$ (500), $M_1$ (502), and $M_2$ (516)).

Figure 6:
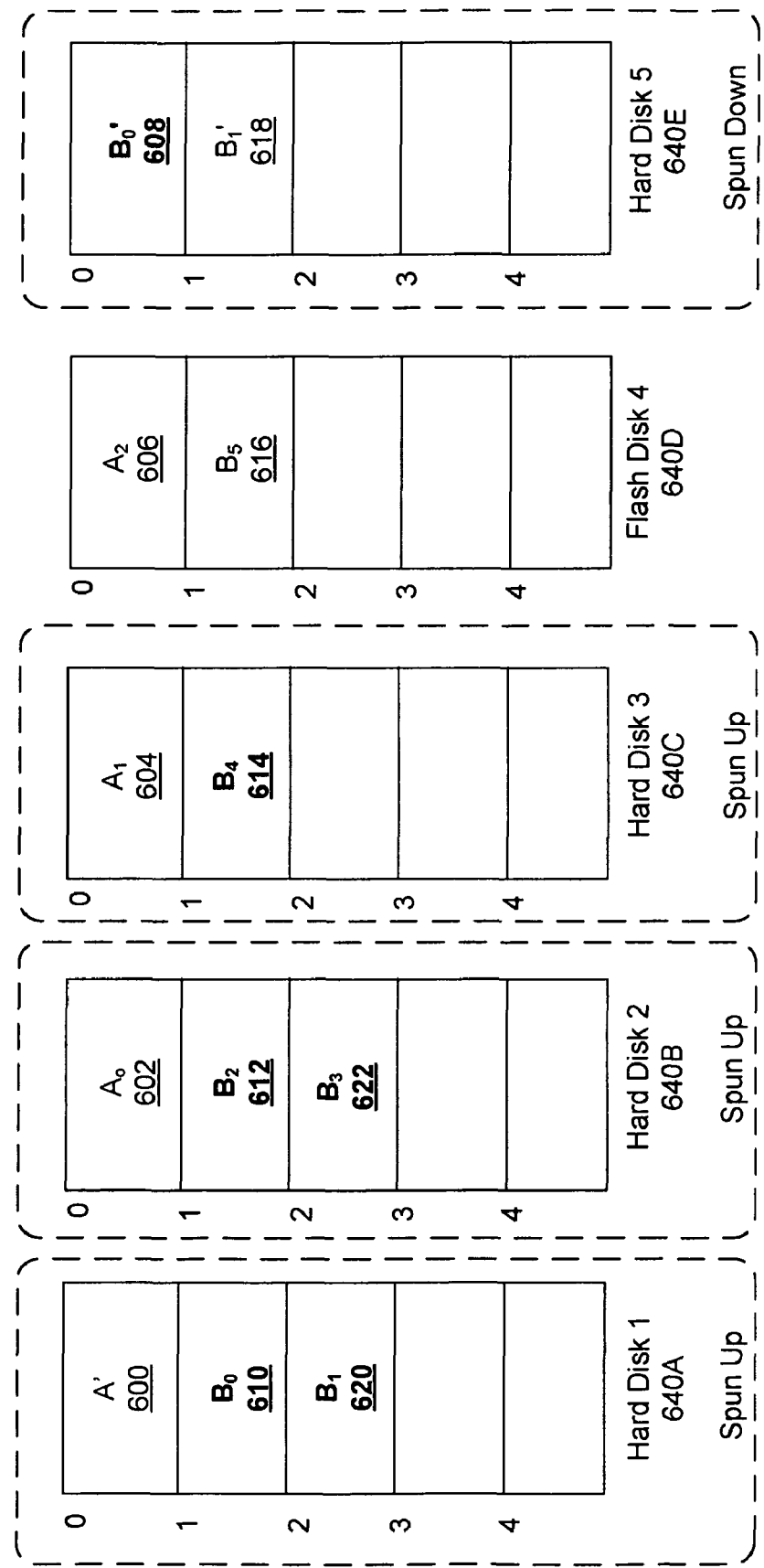
FIG. 6 shows a system in accordance with one or more embodiments of the invention.

FIG. 6 shows a diagram of an example storage pool in accordance with one embodiment of the invention. More specifically, FIG. 6 shows a storage pool in which logical blocks are written using a RAID-type replication method. As shown in FIG. 6, the storage pool includes five storage devices (i.e., Hard Disk 1 (640A), Hard Disk 2 (640B), Hard Disk 3 (640C), Flash Disk 4 (640D), Hard Disk 5 (640E)). Further, two logical blocks, A and B, are stored in the storage pool.

Logical block A is 1.5 Kbytes and is stored across three physical blocks (i.e., $A_0$ (602), $A_1$ (604), and $A_2$ (606)). Further, a single parity block (A' (600)) is generated for logical block A using $A_0$ (602), $A_1$ (604), and $A_2$ (606). As shown in FIG. 6, the parity block (A' (600)) is written to the storage pool first followed by the physical blocks that make up logical block A (i.e., $A_0$ (602), $A_1$ (604), and $A_2$ (606)).

Logical block B is 3 Kbytes and is stored across six physical blocks (i.e., $B_0$ (610), $B_1$ (620), $B_2$ (612), $B_3$ (622), $B_4$ (614), $B_5$ (616)). Further, two parity blocks ($B'_0$ (608) and $B'_1$ (618)) are generated for the aforementioned physical blocks. Specifically, $B'_0$ (608) is generated using $B_0$ (610), $B_2$ (612), $B_4$ (614), $B_5$ (616), while $B'_1$ (618) is generated using $B_1$ (620) and $B_3$ (622).

For the purposes of this example, consider the scenario in which a request for logical block B is received. As discussed above, logical block B is stored in the storage pool using eight physical blocks $B_0$ (610), $B_1$ (620), $B_2$ (612), $B_3$ (622), $B_4$ (614), $B_5$ (616), $B_0'$ (608), and $B_1'$ (618). In the example given, one or more of the aforementioned blocks is present on each of the disks in the storage pool.

The I/O scheduler (or a related process) determines the location for each of the aforementioned physical blocks. Using this information, the power state of each of the hard disks upon which one or more of the physical blocks is located is obtained. In this example, Disk 1 (640A), Disk 2 (640B) and Disk 3 (640C) are spun up, while Disk 5 (640E) is spun down. Disk 4 is flash-type storage devices and do not have a spun-up/spun-down state.

The I/O scheduler then determines the possible subsets of the physical blocks that may be used to construct the logical block. Because the logical block has been stored using a RAID-type replication method, there are multiple subsets of physical blocks that allow for the construction of the logical block. These include:

($B_0$ (610), $B_1$ (620), $B_2$ (612), $B_3$ (622), $B_4$ (614), $B_5$ (616))
($B_1$ (620), $B_2$ (612), $B_3$ (622), $B_4$ (614), $B_5$ (616), $B_0'$ (608))
($B_0$ (610), $B_1$ (620), $B_3$ (622), $B_4$ (614), $B_5$ (616), $B_0'$ (608))
($B_0$ (610), $B_1$ (620), $B_2$ (620), $B_3$ (622), $B_5$ (616), $B_0'$ (608))
($B_0$ (610), $B_1$ (620), $B_2$ (612), $B_3$ (622), $B_4$ (614), $B_0'$ (608))
($B_2$ (612), $B_3$ (622), $B_4$ (614), $B_5$ (616), $B_0'$ (608), $B_1'$ (618))
($B_0$ (610), $B_3$ (622), $B_4$ (614), $B_5$ (616), $B_0'$ (608), $B_1'$ (618))
($B_0$ (610), $B_2$ (620), $B_3$ (622), $B_5$ (616), $B_0'$ (608), $B_1'$ (618))
($B_0$ (610), $B_2$ (612), $B_3$ (622), $B_4$ (614), $B_0$ (608), $B_1'$ (618))
($B_1$ (620), $B_2$ (612), $B_4$ (614), $B_5$ (616), $B_0'$ (608), $B_1'$ (618))
($B_0$ (610), $B_1$ (620), $B_4$ (614), $B_5$ (616), $B_0$ (608), $B_1'$ (618))
($B_0$ (610), $B_1$ (620), $B_2$ (620), $B_5$ (616), $B_0$ (608), $B_1'$ (618))
($B_0$ (610), $B_1$ (620), $B_2$ (612), $B_4$ (614), $B_0'$ (608), $B_1'$ (618))
($B_0$ (610), $B_2$ (612), $B_3$ (622), $B_4$ (614), $B_5$ (616), $B_1'$ (618))
($B_0$ (610), $B_1$ (620), $B_2$ (612), $B_4$ (614), $B_5$ (616), $B_1'$ (618))

Those skilled in the art will appreciate that one or more of the aforementioned subsets includes one or more parity blocks, which may be used to reconstruct one or more of the other physical blocks necessary to obtain logical block B.

The I/O scheduler may then use a wear-level selection policy to determine which subset of physical blocks should be used based on the wear cost required to obtain the physical blocks in the subset. For purposes of this example assume that reading from hard disks that are already spun up is a zero-wear cost, reading from hard disks that are currently spun-down is a wear cost of one, and reading from a flash-type memory (present on the flash disk) is a wear cost of two.

Returning to the example, as shown in FIG. 6, only Disk 1 (640A), Disk 2 (640B), and Disk 3 (640C) are already spun up. Accordingly, it is not possible to read any of the subsets of physical blocks using only the spun up storage devices. Accordingly, it is necessary to spin up an additional disk or read from the flash disk in order to read any of the subsets of physical blocks.

A person skilled in the art would appreciate that reading from either Disk 4 (640D) or Disk 5 (640E) would be sufficient to read one of the subsets of physical blocks necessary to reconstruct logical block B. For the purposes of this example, the wear-level selection policy selects Disk1 (640A), Disk2 (640B), Disk3 (640C), and Disk5 (640E). The disks chosen to read from are based on a wear-level policy which minimizes wear cost. For purposes of the example, the subset of physical blocks that are used to construct the logical block include: ($B_0$ (610), $B_1$ (620), $B_2$ (612), $B_3$ (622), $B_4$ (614), $B_0'$ (608)). Retrieved physical blocks $B_0'$ (608), $B_0$ (610), $B_2$ (612), and $B_4$ (614) may be used to reconstruct block $B_5$. Subsequently, physical blocks $B_0$ (610), $B_1$ (620), $B_2$ (612), $B_3$ (622), $B_4$ (614), and constructed physical block $B_5$ may be combined to form logical block B.

Figure 7:
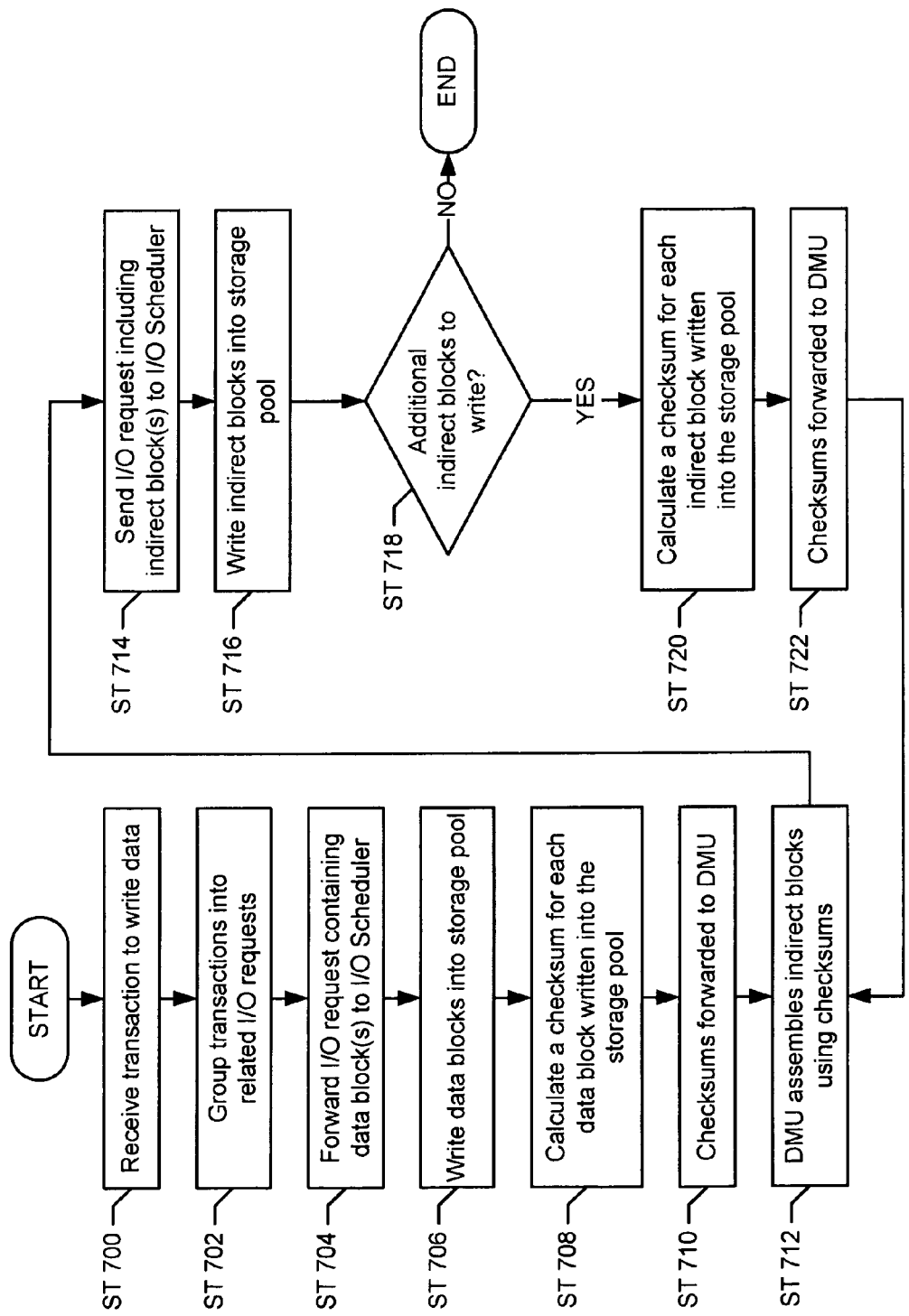
FIG. 7 shows a flow chart in accordance with one or more embodiments of the invention.

FIG. 7 shows a flow chart in accordance with one or more embodiments of the invention. In one or more embodiments of the invention, one or more of the steps discussed below may be omitted, repeated, and/or performed in a different order than the order shown in FIG. 7. Accordingly, the specific arrangement of steps shown in FIG. 7 should not be construed as limiting the scope of the invention.

Initially, the DMU receives a transaction from an application, the operating system (or a subsystem therein), etc. (ST 700). The DMU subsequently groups the transaction into one or more I/O requests (ST 702). The I/O requests are subsequently forwarded to the I/O Scheduler (ST 704).

In one embodiment of the invention, the transaction includes one or more data blocks, and/or one or more indirect blocks. As noted above, the file system is stored on the storage device using a hierarchical structure including data blocks and indirect blocks. Thus, for a given set of transactions, the first I/O request includes the data blocks to be written to the storage device, while subsequent I/O requests include the corresponding indirect blocks containing one or more block pointers. Accordingly, I/O request referenced in ST 704 includes data blocks.

Continuing with the discussion of FIG. 7, the I/O Scheduler, upon receiving the I/O request including data blocks from the DMU, determines on which storage device(s) to write the data blocks, and subsequently issues the writes to the storage pool. The data blocks are subsequently written into the storage pool (ST 706). ST 706 is described in further detail in FIG. 8. Subsequently, the checksum for each data block written into the storage pool is calculated (ST 708). The checksums are subsequently forwarded to the DMU (ST 710). The DMU then assembles the indirect blocks using the checksums (ST 712). Specifically, the DMU places the checksum for a given data block in the appropriate block pointer within the indirect block (i.e., the parent indirect block of the data block). Next, the indirect blocks are forwarded to the I/O Scheduler (ST 714). Those skilled in the art will appreciate that the aforementioned indirect blocks correspond to the indirect blocks that directly point (via the block pointers) to the data blocks (as opposed to indirect blocks that point to other indirect blocks).

Upon receiving the I/O request including data blocks from the DMU, determines on which storage device(s) to write the data blocks, and subsequently issues the writes to the storage pool. The data blocks are subsequently written into the storage pool (ST 716). ST 716 is described in further detail in FIG. 8. A determination is then made about whether additional indirect blocks exist to write into the storage pool (i.e., whether the last indirect block written to the storage pool corresponds to the root block) (ST 718). If no additional indirect blocks exist, then the method is complete. However, if additional indirect blocks exist, then the checksum from each of the indirect blocks written into the storage pool (ST 720) is calculated. The checksums for each of the indirect blocks is subsequently forwarded to the DMU (ST 722). Steps ST 712 through ST 722 are subsequently repeated until the root block is written into the storage pool.

Figure 8:
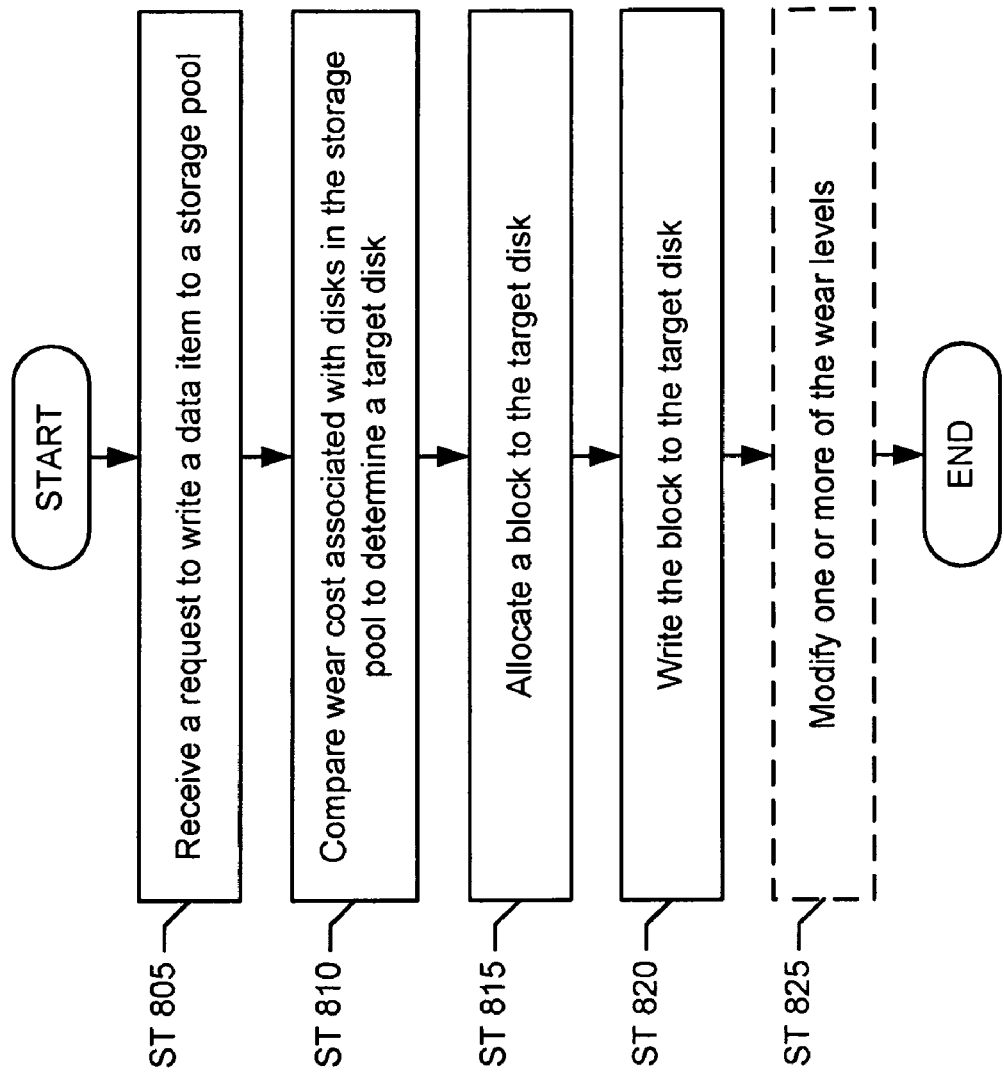
FIG. 8 shows a flow chart in accordance with one or more embodiments of the invention.

FIG. 8 shows a flow chart in accordance with one embodiment of the invention. Specifically, FIG. 8 shows a flow chart of a method for writing data to a storage pool in accordance with one embodiment of the invention. In one embodiment of the invention, one or more of the steps described below may be omitted, repeated, and/or performed in a different order. Accordingly, the specific arrangement of steps shown in FIG. 8 should not be construed as limiting the scope of the invention.

Initially, a request to write a data item to the storage pool is received by the I/O scheduler (ST 805). In ST 810, the wear-level policy, the wear-level data structure, and the wear cost for each of the potential storage devices are used to select a target storage device. Once a target storage device is determined (i.e., ST 810), the block is allocated to the target storage device (ST 815). That is, one or more data locations in the storage device are reserved for the block. The block is subsequently written to the target storage device (ST 820) at the allocated data location(s). As discussed above, the block that is written may be a data block or an indirect block. In ST 825, the wear-level data structure is updated as necessary.

In one embodiment of the invention, once a target storage device is determined (i.e., ST 810), all blocks associated with the data item may be written to the same target storage device. Alternatively (depending, for example, on the block allocation policy used), one or more blocks may be written to different storage devices in the storage pool. Accordingly, ST 810 through ST 820 may be repeated for each block. Further, in one embodiment of the invention, wear levels are optionally modified (i.e., ST 825) between each block write. Alternatively, wear levels may be modified at regular time intervals, after a predetermined number of block writes, between data item write requests, when the power state of a storage device is changed, according to any other similar criteria, or any combination thereof.

FIGS. 9A-9D show an example in accordance with one or more embodiments of the invention. Specifically, FIGS. 9A-9D illustrate a method for managing storage devices in a storage pool. The Figures shown include a storage pool (900) that includes three storage devices: hard disk A (905), hard disk B (910), and a flash-type disk (915).

Figure 9A:
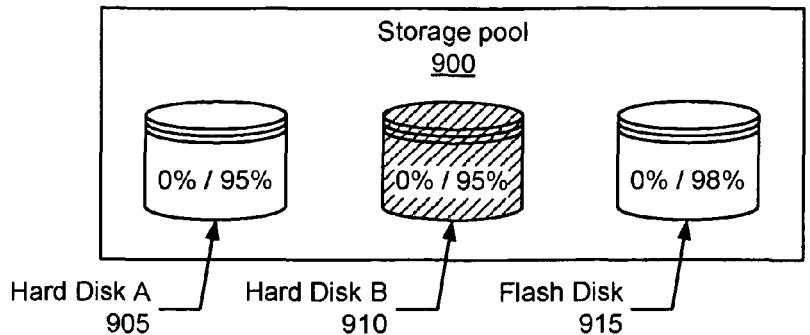
FIGS. 9A-9D show a system in accordance with one or more embodiments of the invention.

FIG. 9A shows the storage pool at an initial state. As shown, no data has been written to the storage pool. Accordingly, each storage device shows 0% wear. Further, each of the storage disks include a threshold wear-level as follows: Hard disk A=95%; Hard disk B=95%; flash-type disk=98%. For the purposes of this example, assume that each hard disk may be used for 100,000 spin-ups and that the flash-type disk may be used for 150,000 writes/cell (where the flash-type disk includes an internal wear-leveling mechanisms to ensure that all cells in the flash-type device are used evenly). The threshold wear-levels are correspond to percentage of the aforementioned number of spin-ups or writes/cell as applicable. Finally, assume that hard disk B (910) is initially spun down. It is important to note that these wear levels are merely for use in this particular example and may be different among other embodiments of the invention.

Figure 9B:
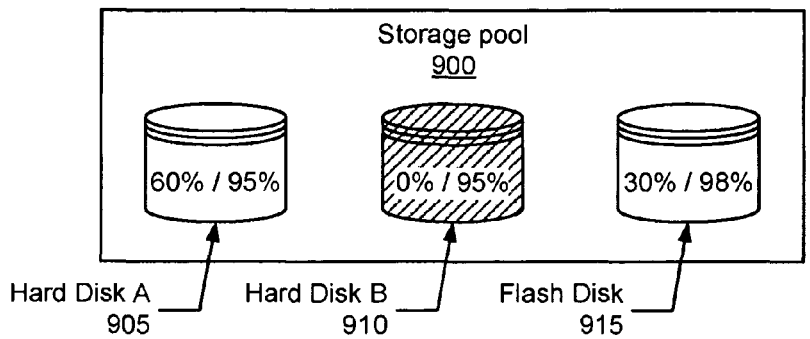

FIG. 9B shows a second phase of the method for managing a storage pool. Referring to FIG. 9B, after a period of use, hard disk A (905) has reached a wear-level of 60% (of 100,000 spin-ups) and the flash-type disk (915) has reached a wear level of 30% (150,000 writes/cell). Further, hard disk B (910) has not been written spun-up.

Figure 9C:
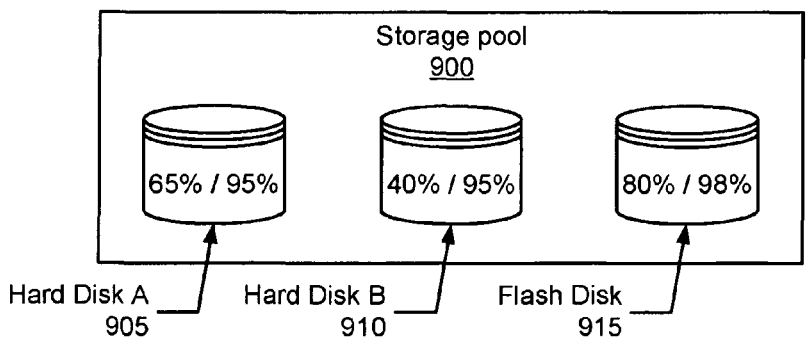

FIG. 9C shows a third phase of the method for managing a storage pool. Referring to FIG. 9C, hard disk A (905) has reached a wear-level of 95% and flash-type disk has reached a wear-level of 90%. In addition, hard disk B (910) has come into use and has reached a 40% wear level. According to one or more embodiments of the invention, the system may have started using hard disk B (910) based on the wear use of the other storage devices and the wear-level policies. For example, when the flash disk (915) reached a wear-level of 80%, the wear-level policy may have spun-up hard disk B (910) and began using hard disk B (910) instead of flash-type disk (915). Further, according to one or more embodiments of the invention, the wear-level of 80% for the flash-type disk (915) may also have triggered a rule in the wear-level policy to begin migration of data from the reached a wear-level at which the wear-level policy dictates that the data from flash-type disk (915) needs to be migrated to other storage devices in the storage pool (900).

Figure 9D:
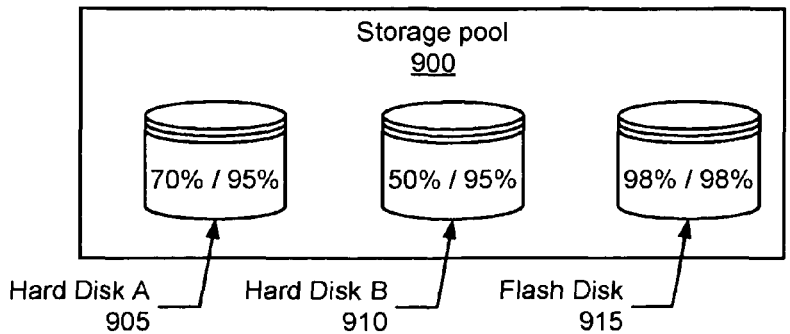

FIG. 9D shows a final phase in the method for managing a storage pool. Referring to FIG. 9D, hard disk A (905) has reached a wear-level of 70%, hard disk B (910) has reached a wear-level of 50%, and the flash-type disk (915) has reached a wear level of 98%, which is its threshold level. At this point, the flash disk (915) will no longer be used to read or write data. According to one or more embodiments of the invention, the system will only use hard disk A (905) and hard disk B (910) to read and write data in the storage pool (900).

Figure 10:
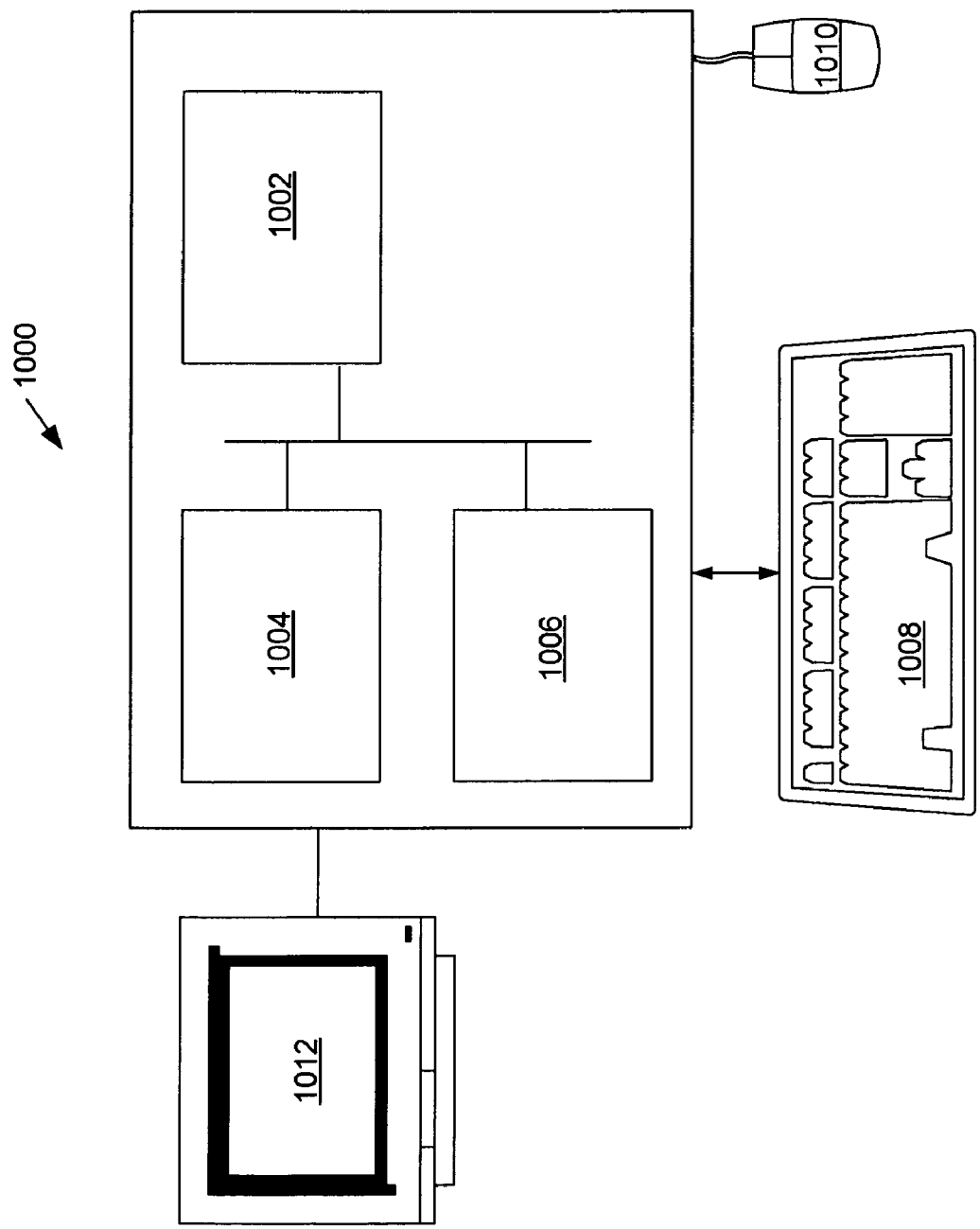
FIG. 10 shows a diagram of a computer system in accordance with one embodiment of the invention.

Embodiments of the invention may be implemented on virtually any type of computer regardless of the platform being used. For example, as shown in FIG. 10, a computer system (1000) includes a processor (1002), associated memory (1004) (e.g., RAM, ROM, etc.), a storage device (1006), and numerous other elements and functionalities typical of today's computers (not shown). The computer (1000) may also include input means, such as a keyboard (1008) and a mouse (1010), and output means, such as a monitor (1012). The computer system (1000) may be connected to a network (1014) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (1000) may be located at a remote location and connected to the other elements over a network. Further, embodiments of the invention may be implemented on a distributed system having a plurality of nodes, where each portion of the invention (e.g., operating system, file system, storage pool, disk, system call interface, data management unit, storage pool allocator, metaslab allocator, I/O management module, compression module, encryption module, checksum module, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for retrieving a logical block, comprising:
   receiving a request to read the logical block;
   obtaining metadata associated with the logical block, wherein the metadata comprises:
      a replication type used to store the logical block;
      physical block locations in a storage pool for each physical block associated with the logical block, wherein each physical block location specifies one of a plurality of storage devices in the storage pool;
   selecting a first set of physical block locations using a wear-level selection policy, wherein selecting the first set of physical locations comprises:
      identifying the first set of physical block locations using the metadata, wherein the physical blocks at the first set of physical block locations combine to form the logical block,
      determining a wear cost to read each of the physical blocks located at the first set of physical block locations to obtain a first plurality of wear costs,
      combining the first plurality of wear costs to obtain a first aggregate wear cost,
      identifying a second set of physical block locations using the metadata, wherein the physical blocks at the second set of physical block locations combine to form the logical block,
      determining a wear cost to read each of the physical blocks located at the second set of physical block locations to obtain a second plurality of wear costs,
      combining the second plurality of wear costs to obtain a second aggregate wear cost, and
      selecting the first set of physical block locations based on the first aggregate wear cost, the second aggregate wear cost, and the wear-level selection policy;
   generating a first set of I/O requests, wherein each I/O request specifies one of the first set of physical block locations;
   issuing a first set of I/O requests;
   receiving the first set of physical blocks in response to the first set of I/O requests; and
   constructing the logical block using the first set of physical blocks.

2. The method of claim 1, further comprising:
   after constructing the logical block, calculating a checksum of the logical block;
   comparing the checksum to a stored checksum of the logical block, wherein the checksum and stored checksum do not match;
   selecting, based on the comparing, the second set of physical block locations;
   generating a second set of I/O requests, wherein each I/O request specifies one of the second set of physical block locations;
   issuing the second set of I/O requests;
   receiving the second set of physical blocks in response to the second set of I/O requests; and
   constructing the logical block using the second set of physical blocks.

3. The method of claim 1, wherein the replication type defines a level of replication of the logical block in the storage pool.

4. The method of claim 3, wherein the replication type is one selected from a group consisting of 2-way mirroring, n-way mirroring, and RAID-type replication.

5. The method of claim 1, wherein selecting the first set of physical block locations further comprises determining a first set of wear-level distribution Input/Output I/O queues using the first set of physical block locations, wherein each of the wear-level distribution I/O queues is associated with one of the plurality of storage devices.

6. A non-transitory computer readable medium comprising a plurality of executable instructions for, retrieving a logical block, wherein the plurality of executable instructions comprises instructions to:
   receive a request to read the logical block;
   obtain metadata associated with the logical block, wherein the metadata comprises:
      a replication type used to store the logical block;
      physical block locations in a storage pool for each physical block associated with the logical block, wherein each physical block location specifies one of a plurality of storage devices in the storage pool;
   select a first set of physical block locations using a wear-level selection policy, wherein selecting the first set of physical locations comprises:
      identifying the first set of physical block locations using the metadata, wherein the physical blocks at the first set of physical block locations combine to form the logical block,
      determining a wear cost to read each of the physical blocks located at the first set of physical block locations to obtain a first plurality of wear costs,
      combining the first plurality of wear costs to obtain a first aggregate wear cost,
      identifying a second set of physical block locations using the metadata, wherein the physical blocks at the second set of physical block locations combine to form the logical block,
      determining a wear cost to read each of the physical blocks located at the second set of physical block locations to obtain a second plurality of wear costs, combining the second plurality of wear costs to obtain a second aggregate wear cost, and selecting the first set of physical block locations based on the first aggregate wear cost, the second aggregate wear cost, and the wear-level selection policy;

generate a first set of I/O requests, wherein each I/O request specifies one of the first set of physical block locations;

issue a first set of I/O requests;

receive the first set of physical blocks in response to the first set of I/O requests; and construct the logical block using the first set of physical blocks.

7. The non-transitory computer readable medium of claim 6, wherein the plurality of executable instructions further comprises instructions to:

after constructing the logical block, calculating a checksum of the logical block;

compare the checksum to a stored checksum of the logical block, wherein the checksum and stored checksum do not match;

select, based on the comparing, the second set of physical block locations;

generate a second set of I/O requests, wherein each I/O request specifies one of the second set of physical block locations;

issue the second set of I/O requests;

receive the second set of physical blocks in response to the second set of I/O requests; and construct the logical block using the second set of physical blocks.

8. The non-transitory computer readable medium of claim 6, wherein the replication type defines a level of replication of the logical block in the storage pool.

9. The non-transitory computer readable medium of claim 8, wherein the replication type is one selected from a group consisting of 2-way mirroring, n-way mirroring, and RAID-type replication.

* * * * *